United States Patent
Hayakawa et al.

(10) Patent No.: US 10,951,982 B2
(45) Date of Patent: Mar. 16, 2021

(54) SIGNAL PROCESSING APPARATUS, SIGNAL PROCESSING METHOD, AND COMPUTER PROGRAM PRODUCT

(71) Applicant: KABUSHIKI KAISHA TOSHIBA, Tokyo (JP)

(72) Inventors: Daichi Hayakawa, Inzai Chiba (JP); Takehiko Kagoshima, Yokohama Kanagawa (JP); Hiroshi Fujimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/544,613

(22) Filed: Aug. 19, 2019

(65) Prior Publication Data

US 2020/0296507 A1 Sep. 17, 2020

(30) Foreign Application Priority Data

Mar. 13, 2019 (JP) .............................. JP2019-046451

(51) Int. Cl.
*H04R 3/00* (2006.01)
*G06N 3/04* (2006.01)
(Continued)

(52) U.S. Cl.
CPC ............... *H04R 3/005* (2013.01); *G06N 3/04* (2013.01); *H04R 1/406* (2013.01); *H04R 29/005* (2013.01)

(58) Field of Classification Search
CPC ...... H04R 3/005; H04R 1/406; H04R 29/005; G06N 3/04
See application file for complete search history.

(56) References Cited

U.S. PATENT DOCUMENTS

2011/0164761 A1* 7/2011 McCowan ............. H04R 3/005
381/92
2014/0314251 A1* 10/2014 Rosca .................... H04R 1/406
381/92
(Continued)

OTHER PUBLICATIONS

Heymann et al., "BEAMNET: End-To-End Training of a Beamformer-Supported Multi-Channel ASR System", IEEE International Conference on Acoustics, Speech and Signal Processing (ICASSP), 2017, pp. 1-5.
(Continued)

*Primary Examiner* — Simon King
(74) *Attorney, Agent, or Firm* — Knobbe, Martens, Olson & Bear, LLP

(57) ABSTRACT

A signal processing apparatus includes one or more processors. The processors acquire a plurality of observed signals acquired from a plurality of microphone groups each including at least one microphone selected from a plurality of microphones. The microphone groups include respective microphone combinations each including at least one microphone, the combinations are different from each other, and at least one of the microphone groups includes a plurality of microphones. The processors estimate a mask indicating occupancy for each of time frequency points of a sound signal of a space corresponding to the observed signal in a plurality of spaces, for each of the observed signals. The processors integrate masks estimated for the observed signals to generate an integrated mask indicating occupancy for each of time frequency points of a sound signal in a space determined based on the spaces.

9 Claims, 6 Drawing Sheets

(51) Int. Cl.
*H04R 29/00* (2006.01)
*H04R 1/40* (2006.01)

(56) References Cited

U.S. PATENT DOCUMENTS

| | | | | |
|---|---|---|---|---|
| 2014/0328487 A1* | 11/2014 | Hiroe | ............... | G10L 21/0272 |
| | | | | 381/56 |
| 2015/0156578 A1* | 6/2015 | Alexandridis | ......... | H04R 3/005 |
| | | | | 381/92 |
| 2015/0163602 A1* | 6/2015 | Pedersen | .............. | H04R 25/554 |
| | | | | 381/315 |
| 2018/0033447 A1* | 2/2018 | Ramprashad | ......... | G10L 21/028 |
| 2018/0190311 A1* | 7/2018 | Kato | ................... | G10L 21/0272 |
| 2019/0206417 A1* | 7/2019 | Woodruff | .............. | G10L 21/028 |
| 2019/0253813 A1* | 8/2019 | Pedersen | .............. | H04R 25/453 |
| 2020/0143819 A1* | 5/2020 | Delcroix | .............. | G06N 3/0481 |

OTHER PUBLICATIONS

Heymann et al., "Neural Network Based Spectral Mask Estimation for Acoustic Beamforming", IEEE International Conference on Acoustics, Speech and Signal Processing (ICASSP), 2016, pp. 1-5.
Nitta, "An Extension of the Back-Propagation Algorithm to Complex Numbers", Neural Networks, 10(8):1391-1415, 1997.
Werbos, "Backpropagation Through Time: What It Does and How to Do It", Proceedings of the IEEE, 78(10):1550-1560, 1990.

* cited by examiner

SIGNAL PROCESSING APPARATUS, SIGNAL PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-046451, filed on Mar. 13, 2019; the entire contents of which are incorporated herein by reference.

FIELD

Embodiments described herein relate generally to a signal processing apparatus, a signal processing method, and a computer program product.

BACKGROUND

A signal processing technique has been proposed. The signal processing technique is a technique observing a signal in which target sound (for example, speech) and background noise (for example, non-speech) exist in a mixed state with a plurality of microphones, and extracting only the target speech from the observed signal.

For example, a proposed technique is a technique of inputting a feature extracted from an observed signal to a neural network learned in advance, and determining the target, sound occupancy and the noise occupancy for each time frequency. The target sound occupancy and the noise occupancy are used for, for example, design of a beamformer suppressing a noise signal in the observed signal, and extracting the sound signal from the observed signal. Another proposed technique is a technique of acquiring a plurality of observed signals, applying an estimation unit to determine target sound occupancy and noise occupancy for each time frequency point for each of the acquired observation signals, with one channel of the observation signals as an input, averaging the acquired target sound occupancies and the noise occupancies, to acquire final target sound occupancy and final noise occupancy. A neural network is used for estimating target sound occupancy and noise occupancy for each time frequency point. The neural network is learned in advance such that target sound occupancy and noise occupancy are output on the basis of the feature extracted from the observed signal.

However, there are cases where target sound is not determined (extracted) with high accuracy in prior art. For example, in the technique using a neural network to which a signal of one channel is input, processing cannot be changed according to the position and the direction in which the sound source exists. For this reason, for example, it is impossible to determine that the sound is target sound when the sound source exists in a specific space, and determine that the sound is obstructing sound when the sound source exists in a space other than the specific space. Means for Solving the Problem

DETAILED DESCRIPTION

Figure 1:
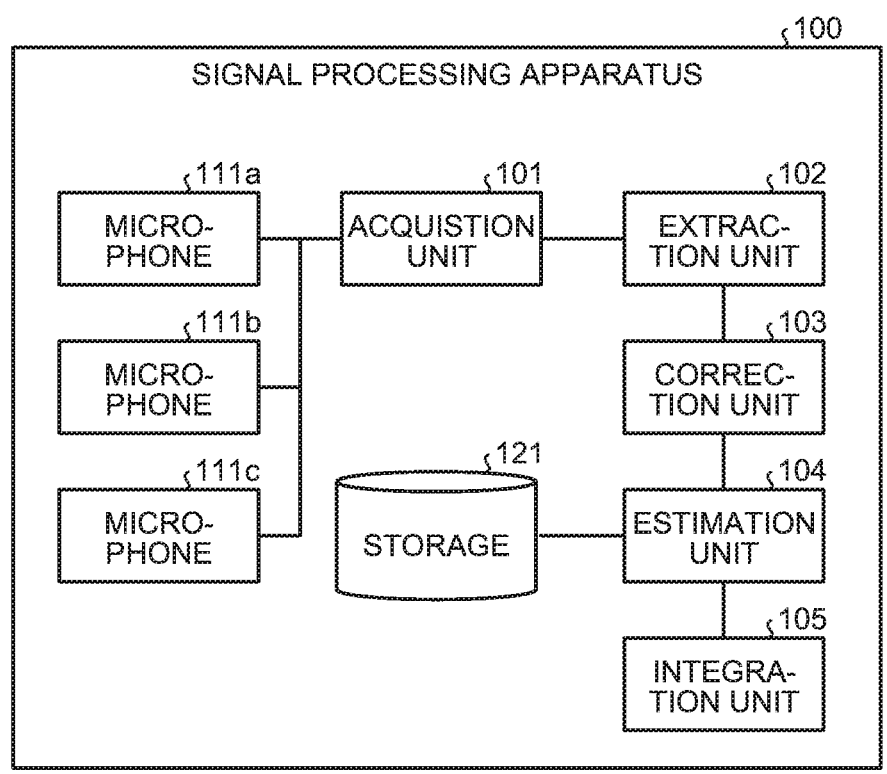
FIG. 1 is a block diagram illustrating a signal processing apparatus according to a first embodiment.

According to one embodiment, a signal processing apparatus includes one or more processors. The processors acquire a plurality of observed signals acquired from a plurality of microphone groups each including at least one microphone selected from two or more microphones. The microphone groups include respective microphone combinations each including at least one microphone, the combinations are different from each other, and at least one of the microphone groups includes two or more microphones. The processors estimate a mask indicating occupancy for each of time frequency points of a sound signal of a space corresponding to the observed signal in a plurality of spaces, for each of the observed signals. The processors integrate masks estimated for the observed signals to generate an integrated mask indicating occupancy for each of time frequency points of a sound signal in a space determined based on the spaces.

The following is a detailed explanation of a preferred embodiment of a signal processing apparatus according to an embodiment. The following explanation mainly illustrates an example of a signal processing apparatus processing a sound signal, such as speech, but applicable signals are not limited to sound signals. For example, the structure is also applicable to signals (time-series signals) other than sound signals, such as radio waves.

As described above, in prior art, because a neural network receiving a one-channel signal is used, for example, it is impossible to determine that the sound is target sound when the sound source exists in a specific space, and determine that the sound is obstructing sound when the sound source exists in a space other than the specific space. As a measure for solving the problem, there is a method of inputting all the observed signals of a plurality of channels, and learning a neural network in advance to treat only the sound signal coming from a sound source in a specific space as the target sound, treat a sound signal coming from a sound source existing in spaces other than the specific space as an obstructing signal, and estimate target sound occupancy and obstructing sound occupancy.

However, such a method has the problem of requiring relearning of the neural network from the beginning when the number of channels of the observed signals and the space of the sound source determined as the target sound signal are to be changed, and requiring much processing load and time cost.

First Embodiment

A signal processing apparatus according to a first embodiment acquires a plurality of observed signals from a plurality of microphone groups each including at least one microphone selected from two or more microphones. The microphone groups include mutually different combinations each including at least one microphone. The signal processing apparatus corrects parameters of observed signals or a model to estimate a mask, for each of observed signals acquired from the microphone groups, when the conditions are changed between the time when a neural network used for mask estimation was learned in advance and the time when observed signals have been observed. The signal processing apparatus estimates occupancy (mask) for each of time frequency points of a sound signal of a space corresponding to the observed signal, for each of the observed signals acquired from the microphone groups and corrected. The signal processing apparatus generates an integrated mask obtained by integrating masks estimated for the observed signals. The integrated mask corresponds to a mask for a space determined with a plurality of spaces corresponding to the respective masks.

Using such an integrated mask enables, for example, achievement of signal processing to determine that the sound is target sound when the sound source exists in a specific space, and determine that the sound is obstructing sound when the sound source exists in a space other than the specific space. In addition, using the integrated mask enables achievement of similar signal processing without newly learning a neural network, even when the number of channels of the observed signals, the positions of the microphones, and the specific space change from those at the time when the neural network was learned in advance.

FIG. 1 is a block diagram illustrating an example of configuration of a signal processing apparatus 100 according to a first embodiment. As illustrated in FIG. 1, the signal processing apparatus 100 includes a plurality of microphones 111 (111a, 111b, and 111c), storage 121, an acquisition unit 101, an extraction unit. 102, a correction unit 103, an estimation unit 104, and an integration unit 105.

The microphones 111a, 111b, and 111c are sound collection devices observing (collecting sound of) observed signals including sound signals. The microphones 111a, 111b, and 111c are also simply referred to as "microphones 111" when it is unnecessary to discriminate them from one another. The following explanation mainly illustrates an example in the case where the number of microphones 111 is three. The number of microphones 111 is not limited to three, but it suffices that the structure includes at least two microphones 111. The microphones 111 may be configured as a microphone array.

The storage 121 stores therein various types of information used for various types of processing performed with the signal processing apparatus 100. For example, the storage 121 stores therein learned parameters (such as weights) of the neural network used for an operation with the estimation unit 104. The storage 121 may be formed of any generally used storage medium, such as a flash memory, a memory card, a random access memory (RAM), a hard disk drive (EGG), and an optical disk.

The acquisition unit 101 acquires various typos of information used for various types of processing performed with the signal processing apparatus 100. For example, the acquisition unit 101 acquires observed signals acquired with the microphones 111. More specifically, the acquisition unit 101 acquires observed signals from a plurality of microphone groups. Each of the microphone groups includes at least one microphone selected from two or more microphones. The microphone groups are formed such that the microphone groups have mutually different combinations of microphones and at least one of the microphone groups includes two or more microphones. The number of microphone groups may be any number as long as the number is two or more.

When the number of microphones 111 is two (microphones 111a and 111b), for example, microphone groups can be formed as follows.

Pattern P1
Microphone Group G1: microphones 111a and 111b
Microphone Group G2: microphone 111a
Pattern P2
Microphone Group G1: microphone 111a
Microphone Group G2: microphones 111a and 111b When the number of microphones is three (microphones 111a, 111b, and 111c), for example, microphone groups can be formed as follows.

Pattern P3
Microphone Group G1: microphones 111a and 111b
Microphone Group G2: microphones 111a and 111c
Microphone Group G3: microphones 111b and 111c
Pattern P4
Microphone Group G1: microphones 111a and 111b
Microphone Group G2: microphones 111a and 111c
Pattern P5
Microphone Group G1: microphones 111a, 111b, and 111c
Microphone Group G2: microphones 111a and 111b The patterns described above are mere examples, and the groups are not limited thereto. As another example, the acquisition unit 101 may be configured to acquire information indicating which microphone(s) 111 is (are) included in each of microphone groups. The information is, for example, pieces of identification information indicating the respective microphones 111, or pieces of information indicating the positions of the respective microphones 111.

The following explanation mainly illustrates the case where the number of microphones 111 is L ($2 \leq L$), and two microphone groups to be used are formed of a microphone group G1 including M ($1 \leq M \leq L$) microphones selected from the L microphones and a microphone group G2 including N ($2 \leq N \leq L$) microphones.

The extraction unit 102 extracts a feature from each of the observed signals acquired from the acquisition unit 101. The feature is, for example, a feature (short-time Fourier transform feature) acquired by converting the observed signal by short-time Fourier transform. The feature is not limited to short-time Fourier transform feature, but may be any information. For example, the feature may be a feature acquired by converting the observed signal by wavelet transform.

The features extracted with the extraction unit 102 are input to the neural network used for estimation processing performed with the estimation unit 104. For example, when the neural network is learned to receive the observed signal itself, not the feature, the apparatus does not require the extraction unit 102.

The correction unit 103 corrects information (input information) to be input to the neural network, or parameters of the neural network, when the conditions are changed between prior learning of the neural network and observation the observed signals. This structure enables execution of signal processing without relearning the neural network. The input information is features extracted from the observed signals, or the observed signals themselves. When no conditions are changed, the structure may include no correction unit 103.

The correction unit 103 determines whether the conditions have been changed on the basis of parameters indicating, for example, the target space (described later) and at least part of configuration (such as the microphones included in the microphone groups and the positions of the microphones included in the microphone groups), and corrects the observed signals or parameters of the neural network used for estimation processing performed with the estimation unit 104 when the conditions have been changed. These parameters are designated, for example, by the user, and the acquisition unit 101 acquires the parameters.

The estimation unit 104 estimates a mask indicating occupancy for each of time frequency points of the sound signal of a space corresponding to the observed signal in a plurality of spaces, for each of a plurality of observed signals acquired with a plurality of microphone groups. Each of the spaces corresponds to one microphone group in the microphone groups. Each space corresponds to a space in which a microphone included in the corresponding microphone group observes an observed signal.

The estimation unit 104 estimates masks using a neural network. The neural network is learned in advance to receive input information (features or observed signals) and output masks (occupancies). The estimation unit 104 may use a plurality of neural networks learned for respective microphone groups, or a neural network learned in common for at least part of the microphone groups.

The integration unit 105 generates a mask (integrated mask) acquired by integrating a plurality of masks estimated for the observed signals. The integrated mask corresponds to a mask for a space determined on the basis of spaces corresponding to the masks. A method for integrating a plurality of masks may be any method. For example, a mean value of masks, the product of masks, or the median of masks can be generated as the integrated mask.

The units (acquisition unit 101, extraction unit 102, correction unit 103, estimation unit 104, and integration unit 105) described above are achieved with, for example, one or more processors. For example, the units described above may be achieved by causing a processor, such as a central processing unit (CPU), to execute a computer program, that is, with software. The units described above may be achieved with processors, such as dedicated integrated circuits (IC), that is, hardware. The units described above may be achieved using software and hardware together. In the case of using a plurality of processors, each of the processors may achieve one of the units, or two or more of the units.

The following is definitions of terms used for explanations of embodiments.

A range of a sound source with which a sound signal coming from the sound source is determined as the target sound is defined as a target space. Specifically, when the sound source is positioned in the target space, an observed signal from the sound source is regarded as a target signal. When the sound source is not positioned in the target space, an observed signal from the sound source is not regarded as a target signal. The term "specific space" described above corresponds to the target space.

The target space is defined with at least one of a plane direction indicated with a plane based on a plurality of microphones, and a perpendicular plane direction indicated with a perpendicular plane perpendicular to the plane. The plane may be determined in any way. For example, the plane may be a plane formed of at least part of the microphones.

The coordinates are defined as follows, for example. First, among combinations of two microphones included in a plurality of microphones, a combination with the longest distance between the two microphones is selected, and a straight line extending through the positions of the selected two microphones is defined as an x axis. In addition, a y axis is a perpendicular bisector (line on the plane) of a line segment connecting the positions of the selected two microphones. A z axis is a straight line extending through an intersection point of the perpendicular bisector with the x axis and perpendicular to the plane.

Figure 2:
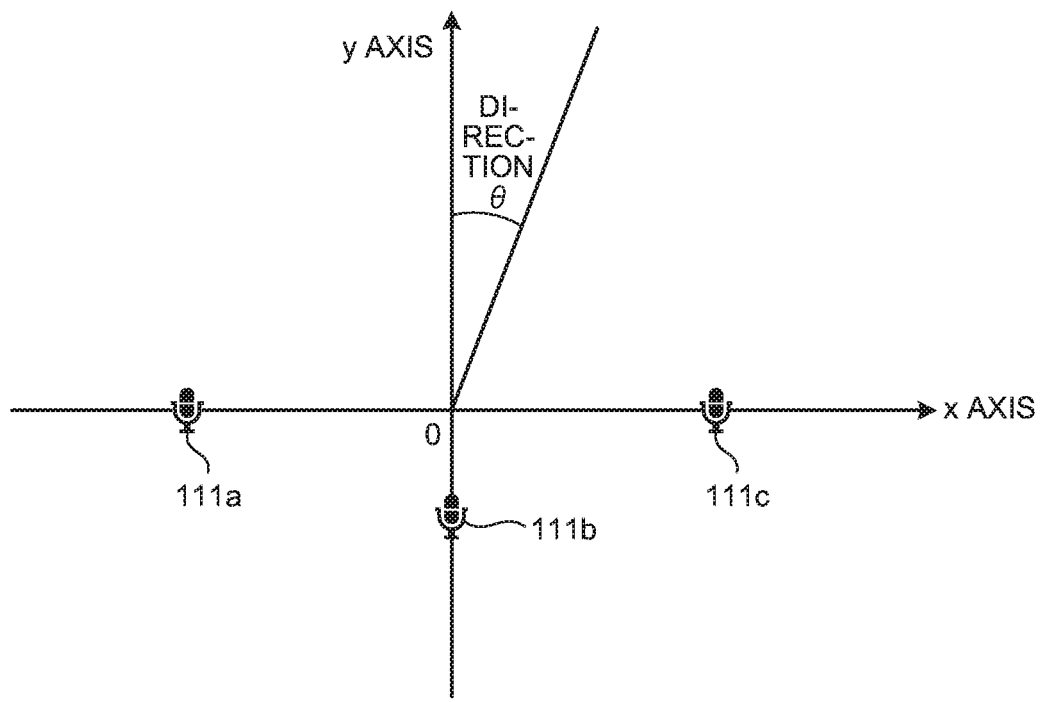
FIG. 2 is a diagram illustrating an example of a method for designating a plane direction.

FIG. 2 is a diagram illustrating an example of a method for designating the plane direction. As illustrated in FIG. 2, the plane direction is indicated with a clockwise angle with the y axis serving as 0° in a xy plane. The perpendicular plane is indicated with a clockwise angle with the x axis serving as 0° in, for example, an xz plane.

Figure 3:
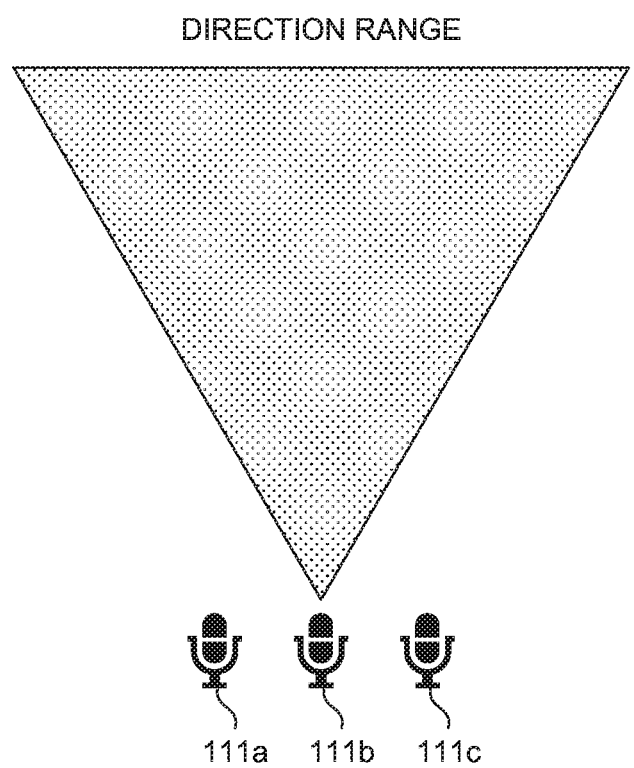
FIG. 3 is a diagram illustrating an example in which a target space is designated with a direction range.

First, suppose that the target space and the microphones are positioned on the same plane. Specifically, suppose that the perpendicular direction of the target space is 0°. The case where the target space and the microphones are not positioned on the same plane will be described later. The user may designate one direction (designate one angle) indicating the target space, or designate a range (direction range) of the direction indicating the target space. FIG. 3 is a diagram illustrating an example of designating the target space with a direction range.

The direction designated by the user as the direction indicating the target space is defined as the target direction hereinafter. In addition, the angle (angle indicating one direction in the range when the range of the target direction is designated) designated as the target direction is denoted by $\theta_{tgt}$.

Figure 4:
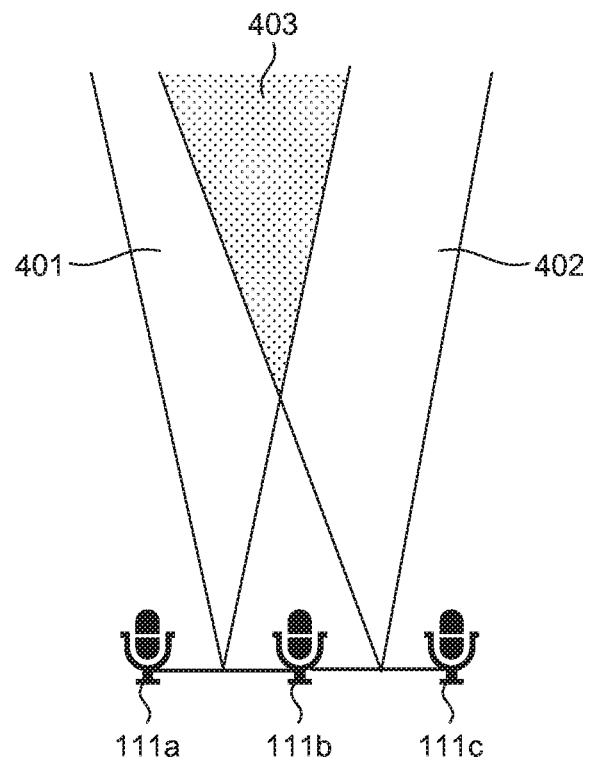
FIG. 4 is a diagram illustrating an example of a method for designating the target space.
Figure 5:
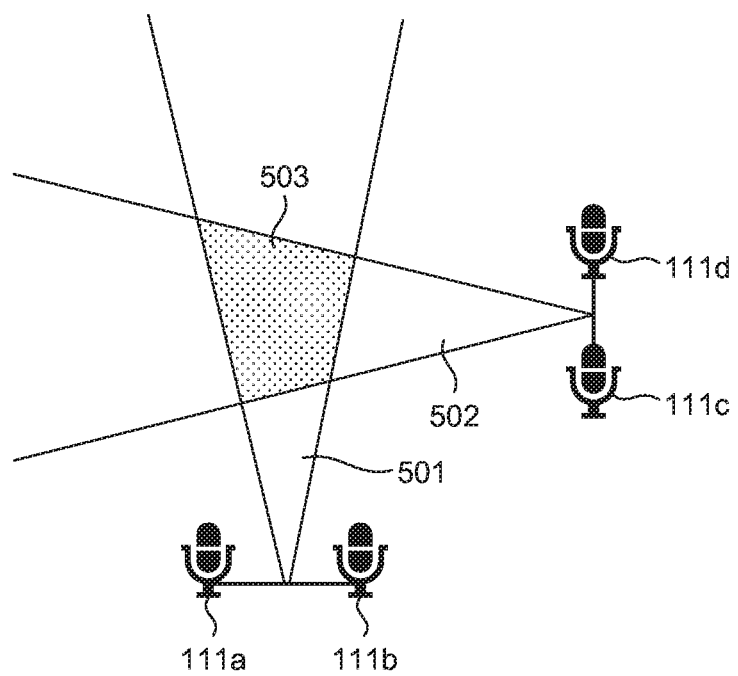
FIG. 5 is a diagram illustrating an example of the method for designating the target space.

Various methods may be used as the method for designating the target direction, that is, the method for determining the target space, according to the use. FIG. 4 and FIG. 5 are diagrams illustrating examples of the method for designating the target space.

FIG. 4 is based on the supposition that a neural network is learned in advance to receive two observed signals and output occupancy of the sound signal coming from the target direction, and occupancy of the sound signal coming from the target direction (space 403) is determined using three observed signals (microphones 111).

Generally, estimating occupancy by inputting three observed signals enables estimation of occupancy with higher performance than that in the case of estimating occupancy by inputting two observed signals. However, in prior art, because it is impossible to apply a neural network prepared in advance and using two observed signals as inputs without any processing. For this reason, prior art requires prior learning of a neural network estimating occupancy with three observed signals as inputs.

By contrast, in the present embodiment, the target direction corresponding to the microphone group including the microphones 111a and 111b and the target direction corresponding to the microphone group including the microphones 111b and 111c are set in the same direction as the target direction corresponding to three observed signals, such as a space 401 and a space 402. Integrating occupancy of the sound source from the space 401 and occupancy of the sound source from the space 402 enables determination of occupancy of the sound source from the target space 403 serving as the overlapping part of the spaces 401 and 402.

As another example, it is also possible to determine occupancy of the sound source from a specific closed area, such as a target space 503 of FIG. 5. In this case, for example, two microphone groups each being formed of two microphones 111 are set to surround the closed area, and the target direction corresponding to the microphone group including the microphones 111a and 111b and the target direction corresponding to the microphone group including the microphones 111c and 111d are set, such as a space 501 and a space 502, respectively.

Integrating occupancy of the sound source from the space 501 and occupancy of the sound source from the space 502 enables determination of occupancy of the sound source from the target space 503 serving as the overlapping part of the spaces 501 and 502, that is, the closed area.

The following is an explanation of details of estimation processing performed with the estimation unit. 104. The estimation unit 104 estimates occupancy (mask) of each of time frequency points of the sound signal from the target space. The occupancy of the sound signal from the target space is expressed with the following expression (1), for example, where A is the power of the sound signal from the target space and B is the power of the sound signal from spaces other than the target space.

$$\text{Occupancy} = A/(A+B) \tag{1}$$

The method for calculating the occupancy is not limited to the expression (1). For example, supposing that the power of the sound signal from the target space is in the state of being sufficiently larger than the power of the sound signal from spaces other than the target space and the power of the background noise or in the state of substantially 0, and the estimation unit 104 may calculate the posterior probability that the signal in each of time frequency points is in the former state as the occupancy. As described above, the value indicating the occupancy of the sound signal in all the time frequency points for each of time frames is defined as the mask.

The estimation unit 104 estimates a mask (occupancy) using a neural network learned to output occupancy of the sound signal coming from a predetermined direction with features extracted from, for example, K ($2 \leq K \leq M$, $2 \leq K \leq N$) observed signal. The predetermined direction is, for example, 0° direction. In the following explanation, the predetermined direction is defined as initial target direction, and denoted by "$\theta_{init}$".

In the following cases, the neural network learned to output occupancy of the sound signal coming from the direction $\theta_{init}$ cannot be used as it is.

(1) the case where the initial target direction $\theta_{init}$ is different from $\theta_{tgt}$: for example, the case corresponds to the case of estimating occupancy of the sound signal coming from the direction of 30° using a neural network learned in advance with the initial target direction of 0°.

(2) the case where the positional relation of K microphones at the time when the neural network was learned in advance is different from the positional relation of K microphones that have observed the input K observed signals: in this case, the correction unit 103 corrects, for example, the input features to enable output of occupancy of the sound signal coming from the direction $\theta_{tgt}$. The specific method thereof will be described later.

The following is an explanation of an example of features input to the neural network. The neural network receives short-time Fourier transform features of K observed signals. The K observed signals are denoted by $x_k$ (k=1 to K), and each of the short-time Fourier transform features of $x_k$ is denoted by $X_k(t,f)$. The symbols k, t, and f are the observed signal, the time frame, and the index of the frequency bin, respectively, and satisfy "k=1 to K, t=1 to T, and f=0 to F". T indicates the total number of the time frames, and F indicates the total number of indexes of the frequency bin.

The neural network receives X(t) obtained by laterally connecting the short-time Fourier transform features of the K observed signals in the time frame t, as the following expression (2). In the following expression, the symbol """ denotes a transposition.

$$X(t) = [X_1(t,0), X_1(t,1), \ldots, X_1(t,F), X_2(t,0), X_2(t,1), \ldots, X_2(t,F), \ldots, X_K(t,0), X_K(t,1), \ldots, X_K(t,F)]' \tag{2}$$

The neural network is learned to estimate, for example, occupancy of only the sound signal coming from the preset initial target direction $\theta_{init}$ (for example, the direction of 0°). Specifically, a supervised mask is prepared using the method disclosed in Reference Document 1, and learning is performed on the basis of the input features and the supervised mask.

Reference Document 1: Jahn Heymann, Lukas Drude, and Reinhold Haeb-Umbach, "Neural network based spectral mask estimation for acoustic beamforming", in IEEE International Conference on Acoustics, Speech and Signal Processing (ICASSP), 2016.

When features are input to the neural network learned as described above, the output is occupancy of the sound signal coming from the sound source from the direction $\theta_{init}$. As described above, it is possible to prepare in advance a neural network to estimate a mask enabling the target sound only when the direction of the sound source is the direction $\theta_{init}$.

For example, a complex-valued neural network including a layer inputting and outputting a complex number can be used as such a neural network.

A complex-valued neural network is a neural network including a layer having an input and an output and parameters, such as weight and bias, being complex values. The elements of the input and the output and parameters may include a real number. In this case, an imaginary part is handled as a complex number of 0. In the following explanation, a layer having an input and an output and parameters being complex values is referred to as a complex-valued layer, and a layer having an input and an output and parameters being complex values is referred to as a real-valued layer. The complex-valued neural network is formed of an input layer, at least one complex-valued layer, an absolute layer, 0 or more (it means that the layer may be omitted) real-valued layer, and an output layer arranged in this order.

The following is examples of operations of the layers in the case of including a complex-valued layer, an absolute layer, and a real-valued layer, with the following expressions (3) to (6).

$$\text{Complex-valued layer: } h_1(t) = \tanh(|C_1 X(t)|) \exp(i \arg(C_1 X(t))) \tag{3}$$

$$\text{Absolute layer: } h_2(t) = |h_1(t)| \tag{4}$$

$$\text{Hidden layer: } h_3(t) = \tanh(R_3 h_2(t)) \tag{5}$$

$$\text{Output layer: } \text{Out}(t) = \text{sigmoid}(R_o h_3(t)) \tag{6}$$

Symbols $h_1(t)$, $h_2(t)$, $h_3(t)$, and Out(t) are vectors indicating outputs of the complex-valued layer, the absolute layer, the hidden layer, and the output layer, respectively, $C_1$ is a matrix (weight matrix) indicating weight (complex-valued) of the complex-valued layer. $R_3$ and $R_o$ are matrixes (weight matrixes) indicating weights (real-valued) of the real-valued layer and the output layer, respectively. The symbol i indicates an imaginary unit. The symbol |•| indicates an operation to obtain the absolute value of each element of the vector. The symbols "tanh" and "sigmoid" indicate operations applying a hyperbolic tangent function and a sigmoid function, respectively, to each element of the vector. The symbol "arg" indicates an operation to obtain the phase of each element of the vector.

Learning of weight of the complex-valued neural network can be achieved by the method disclosed in Reference Document 2 described below with respect to the real-valued layer, and the method disclosed in Reference Document 3 described below with respect to the complex-valued layer.

Reference Document 2: P. J. Werbos, "Backpropagation Through Time: What is Does and How to Do it", Proceedings of the IEEE, vol. 78, no. 10, pp. 1550-1560, October 1990.

Reference Document 3: T. Nitta, "An extension of the back-propagation algorithm to complex numbers", Neural Netw., vol. 10, no. 8, pp. 1391-1415, November 1997.

The neural network receives K observed signals, but the number of observed signals selected when they are input to the extraction unit 102 does not necessarily agree with K. Specifically, the number may satisfy "K=M=N" or "K<N and K<N". When "K<N" is satisfied, for example, K observed signals are selected from N observed signals, and used for estimation of the mask. The structure may be a structure in which a plurality of combinations of K observed signals are selected from N observed signals, and a plurality of masks estimated for the respective combinations are integrated. The Integration method may be a method similar to that of the integration unit 105 described later.

The following is an explanation of details of the correction unit 103.

When $\theta_{init}$ agrees with $\theta_{tgt}$ and the positional relation of K microphones at the time when the neural network was learned in advance agrees with the positional relation of K microphones that have observed the input K observed signals, the target sound occupancy estimated using the neural network learned in advance can be used as occupancy of the sound signal from the direction $\theta_{tgt}$ without any processing. In this case, no correction unit 103 may be provided.

However, in the following cases, occupancy of the sound signal from the target direction cannot be obtained using the neural network learned in advance without any processing.

Case 1: the case where $\theta_{init}$ is different from $\theta_{tgt}$.

Case 2: the case where the Positional relation of K microphones at the time when the neural network was learned in advance is different from the positional relation of K microphones that have observed the input K observed signals.

In the cases described above, the correction unit 103 corrects, for example, the input features (example of the input information) to enable output of occupancy of the target direction. For example, the correction unit 103 multiplies X(t) by a correction matrix A as expressed with the following expressions (7) and (8).

$$A = \begin{bmatrix} A_1 & 0 & \cdots & 0 \\ 0 & A_2 & 0 & \vdots \\ \vdots & 0 & \ddots & 0 \\ 0 & \cdots & 0 & A_K \end{bmatrix} \quad (7)$$

$$A_k = \begin{bmatrix} 1 & 0 & \cdots & 0 \\ 0 & \exp(-i\Delta_\omega \tau_k) & 0 & \vdots \\ \vdots & 0 & \ddots & 0 \\ 0 & \cdots & 0 & \exp(-iF\Delta_\omega \tau_k) \end{bmatrix} (k=1\ldots K) \quad (8)$$

The matrix A is a matrix in which elements other than the diagonal components are 0. The matrix $A_k$ is a matrix in which elements other than the diagonal components are 0. $\Delta_\omega$ is a constant and, for example, expressed with "$\Delta_\omega = 2\pi/$ (time length of one frame). $\tau_k$ is obtained with the following expression (9), when $s_k$ is the delay time of the acoustic waves in the position of the microphone that has observed the observed signal $x_k$ on the basis of the origin of the three-dimensional coordinates.

$$\tau_k = (s_k \text{ with the sound source direction } \theta_{init} \text{ and in the micro phone position in prior learning} - s_k \text{ with sound source the direction } \theta_{tgt} \text{ and in the microphone position in observation}) \quad (9)$$

The estimation unit 104 receives "X'(t)=AX(t)". Correcting the input information as described above enables determination of occupancy of the sound signal coming from the sound source from the direction $\theta_{tgt}$, even when the position of the microphone has changed from the position in prior learning. Specifically, this structure enables achievement of the signal processing apparatus enabling determination that the sound is the target sound only when the direction of the sound source is $\theta_{tgt}$ by applying the neural network determining that the sound is the target sound only when the direction of the sound source is $\theta_{init}$.

The following is an explanation of a method for preparing the correction matrix of Case 1, and a method for preparing the correction matrix in the case where both Case 1 and Case 2 occur, with an example of the case of "K=2".

Case where only Case 1 Occurs

For example, suppose that position vectors $p_1$ and $p_2$ of the microphones that have obtained observed signals $x_1$ and $x_2$ are expressed with the following expression (10).

$$p_1 = (-d_x/2, 0, 0)', p_2 = (d_x/2, 0, 0)' \quad (10)$$

The symbol $d_x$ corresponds to the interval between the two microphones that have observed the observed signals. Supposing that the acoustic waves from the sound source are plane waves, when the acoustic waves propagate from the direction $\theta$ in the xy plane (z=0 plane), the unit vector of the sound source direction is expressed with the following expression (11).

$$u_\theta = (\sin \theta, \cos \theta, 0)' \quad (11)$$

In this operation, when c (for example, c=340 m/sec is used) is a constant indicating the sonic speed, the delay time $s_k$ is expressed with the following expression (12).

$$s_k = -(1/c) \times u_\theta' p_k (k=1,2) \quad (12)$$

Accordingly, $\tau_1$ and $\tau_2$ can be determined with the following expressions (13) and (14).

$$\tau_1 = (d_x/2c) \times (\sin \theta_{init} - \sin \theta_{tgt}) \quad (13)$$

$$\tau_2 = -(d_x/2C) \times (\sin \theta_{init} - \sin \theta_{tgt}) \quad (14)$$

The correction matrix A can be determined with the following expression (15).

$$A = \begin{bmatrix} 1 & 0 & \cdots & \cdots & \cdots & \cdots & \cdots & 0 \\ 0 & \exp(-i\Delta_\omega\tau_1) & 0 & \cdots & \cdots & \cdots & \cdots & 0 \\ 0 & 0 & \ddots & 0 & \cdots & \cdots & \cdots & 0 \\ 0 & \cdots & 0 & \exp(-iF\Delta_\omega\tau_1) & 0 & \cdots & \cdots & 0 \\ 0 & \cdots & \cdots & 0 & 1 & 0 & \cdots & 0 \\ 0 & \cdots & \cdots & \cdots & 0 & \exp(-i\Delta_\omega\tau_2) & 0 & 0 \\ 0 & \cdots & \cdots & \cdots & \cdots & 0 & \ddots & 0 \\ 0 & \cdots & \cdots & \cdots & \cdots & \cdots & 0 & \exp(-iF\Delta_\omega\tau_2) \end{bmatrix} \quad (15)$$

Case where Both Case 1 and Case 2 Occur

Suppose that the position vectors $p_1$ and $p_2$ of the microphones in prior learning are expressed with the following expression (16). The symbol "$d_{old}$" corresponds to the interval between the two microphones in prior learning.

$$p_1 = (-d_{old}/2, 0, 0)', p_2 = (d_{old}/2, 0, 0)' \quad (16)$$

Suppose that the position vectors $p_1$ and $p_2$ of the microphones when observed signals $x_1$ and $x_2$ have been obtained are expressed with the following expression (17). The symbol "$d_{new}$" corresponds to the interval between the two microphones when observed signals $x_1$ and $x_2$ have been obtained.

$$p_1 = (-d_{new}/2, 0, 0)', p_2 = (d_{new}/2, 0, 0)' \quad (17)$$

Supposing that the acoustic waves from the sound source are plane waves, when the acoustic waves propagate from the direction θ in the xy plane (z=0 plane), $\tau_1$ and $\tau_2$ can be determined with the following expressions (18) and (19), in the same manner as the case where only Case 1 occurs.

$$\tau_1 = (d_{old}/2c) \times \sin\theta_{init} - (d_{new}/2c) \times \sin\theta_{tgt} \quad (18)$$

$$\tau_2 = -(d_{old}/2c) \times \sin\theta_{init} + (d_{new}/2c) \times \sin\theta_{tgt} \quad (19)$$

The correction matrix A can be constructed with the expression (15) using $\tau_1$ and $\tau_2$ obtained as described above.

Although the explanation described above illustrates the method for correcting the input features X(t), the same function can also be achieved by multiplying the weight ($C_1$ in the example described above) of the first complex-valued layer by the correction matrix A in advance. In the case where only Case 2 occurs, for example, correction can be performed using a correction matrix obtained by replacing $\theta_{tgt}$ in the expressions (18) and (19) described above by $\theta_{init}$.

The following is an explanation of the output of the estimation unit 104. The explanation described above illustrates the method for determining occupancy of the sound signal coming from the sound source from the direction $\theta_{tgt}$. When the user designates the target direction as a certain direction $\theta_{tgt}$, the estimated occupancy can be used as the output without any processing.

By contrast, when the target direction is designated as a direction range, not a direction, the estimation unit 104 determines an output of a mask as follows. Occupancy of the sound signal from the direction $\theta_{tgt}$ in the time frame t (t=1 to T) is expressed with the following expression (20).

$$M(t,\theta_{tgt}) = [m(t,0,\theta_{tgt}), m(t,1,\theta_{tgt}), \ldots, m(t,F',\theta_{tgt})] \quad (20)$$

m (t, f', $\theta_{tgt}$) indicates occupancy of the sound signal from the direction $\theta_{tgt}$ in the time frame t and the frequency index f' (f'=0 to F'). When the direction range is D, occupancy M(t) of the sound signal from the target direction is determined with the following expression (21). The function "argmax" under which "$\theta_{tgt} \in D$" is described indicates an operation obtaining the maximum value when the direction $\theta_{tgt}$ is moved in the range D.

$$M(t) = \left[ \operatorname*{argmax}_{\theta_{tgt} \in D} m(t, 0, \theta_{tgt}), \operatorname*{argmax}_{\theta_{tgt} \in D} m(t, 1, \theta_{tgt}), \ldots, \operatorname*{argmax}_{\theta_{tgt} \in D} m(t, f, \theta_{tgt}) \right] \quad (21)$$

In the case of using two microphone groups, the estimation unit 104 calculates occupancy M(t) for each of the microphone groups. The occupancies calculated for the respective two microphone groups are referred to as $M_1(t)$ and $M_2(t)$ hereinafter.

The following is an explanation of details of integration processing performed with the integration unit 105. The following expressions (22) to (24) indicate occupancies $M_1(t)$ and $M_2(t)$ of the sound signal from the target direction in the time frame t (t=1 to T) output from the estimation unit 104, and occupancy $M_{all}(t)$ of the sound signal from the target direction in the time frame t (t=1 to T) output from the integration unit 105, respectively.

$$M_1(t) = [m_1(t,0), m_1(t,1), \ldots, m_1(t,F')] \quad (22)$$

$$M_2(t) = [m_2(t,0), m_2(t,1), \ldots, m_2(t,F')] \quad (23)$$

$$M_{all}(t) = [m_{all}(t,0), m_{all}(t,1), \ldots, m_{all}(t,F')] \quad (24)$$

The symbols $m_1$ (t, f') and $m_2$(t, f') indicate occupancies of the sound signal from the direction $\theta_{tgt}$ in the time frame t and the frequency index f' (f'=0 to F') output from the estimation units 104 for the respective two microphone groups. The occupancy "$m_{all}$(t, f')" is output from the integration unit 105, and indicates occupancy of the sound signal from the direction $\theta_{tgt}$ in the time frame t and the frequency index f'(f'=0 to F').

The integration unit 105 receives $M_1(t)$ and $M_2(t)$, and outputs $M_{all}(t)$. The elements of $M_{all}(t)$ is determined by a mean value of a plurality of occupancies, as illustrated in the following expression (25).

$$m_{all}(t,f') = (m_1(t,f') + m_2(t,f'))/2 \quad (25)$$

Instead of the expression (25), the product of the two values may be calculated, as expressed in the following expression (26).

$$m_{all}(t,f') = m_1(t,f') m_2(t,f') \quad (26)$$

The explanation described above illustrates discussion based on the case where two masks are input to the integration unit 105, the outputs of the estimation unit 104 may be three or more. R (2≤R) is the number of masks to be input to the integration unit 105. The following expression (27)

indicates occupancy of the sound signal from the target direction in the time frame t (t=1 to T), output from the estimation unit 104 for the rth (1≤r≤R) microphone group.

$$M_r(t)=[m_r(t,0),m_r(t,1),\ldots,m_r(t,F')] \quad (27)$$

Each of the elements of $M_{all}$(t) is determined with a mean value of a plurality of occupancies, as expressed with the following expression (28).

$$m_{all}(t, f') = \frac{\sum_{r=1}^{R} m_r(t, f')}{R} \quad (28)$$

Instead of the expression (28), each of the elements may be calculated with the following expression (29) or expression (30).

$$M_{all}(t, f') = \text{median of } m_r(t, f') \ (r = 1 \text{ to } R) \quad (29)$$

$$m_{all}(t, f') = \prod_{r=1}^{R} m_r(t, f') \quad (30)$$

Figure 6:
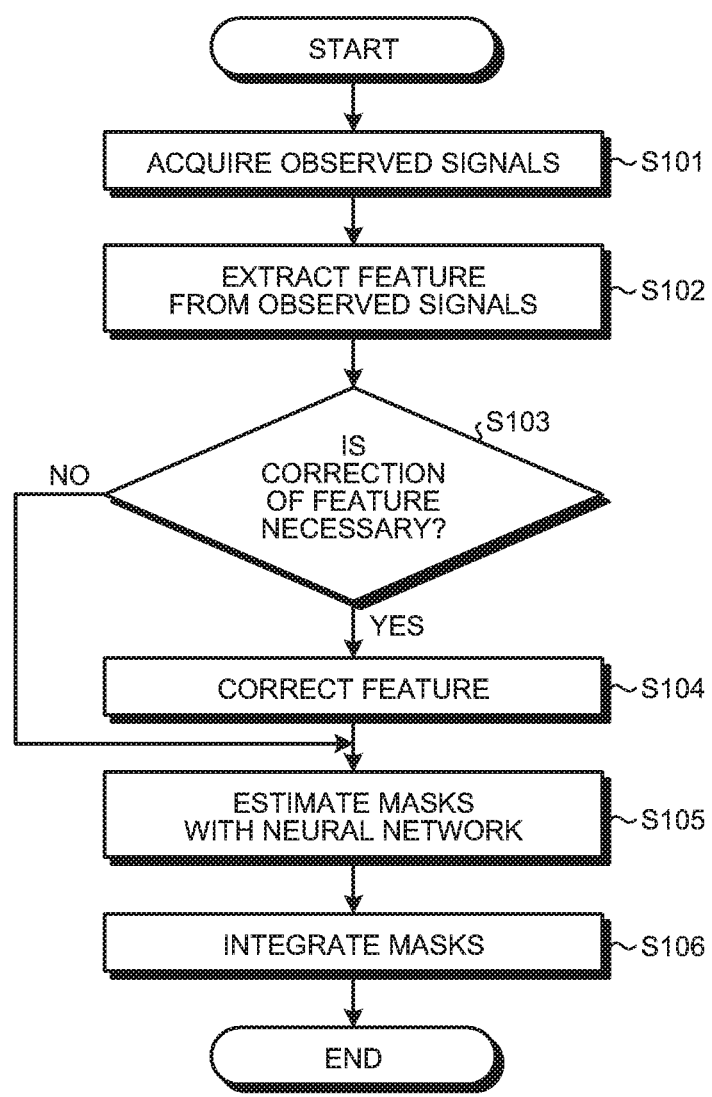
FIG. 6 is a flowchart illustrating an example of signal processing according to the first embodiment.

The following is an explanation of signal processing performed with the signal processing apparatus 100 according to the first embodiment. FIG. 6 is a flowchart illustrating an example of signal processing in the first embodiment.

The acquisition unit 101 acquires observed signals from microphones 111 (Step S101). For example, the acquisition unit 101 acquires observed signals from microphones 111 included in the microphone group G1, and acquires observed signals from the microphones 111 included in the microphone group G2. The extraction unit 102 extracts features from the respective signals corresponding to the respective microphone groups (Step S102).

The correction unit 103 determines whether correction of the features is necessary (Step S103). For example, the correction unit 103 determines that correction of the features is necessary, when at least one of Case 1 and Case 2 described above occurs. When correction of the features is necessary (Yes at Step S103). The correction unit 103 corrects the extracted features (Step S104).

When correction of the features is not necessary (No at Step S103), or after the features are corrected, the estimation unit 104 estimates the masks (occupancy) by inputting the features to the neural network (Step S105). For example, the estimation unit 104 inputs the features extracted using the observed signals from the microphone group G1 to the neural network to calculate the occupancy M$_1$(t). In addition, the estimation unit 104 inputs the features extracted using the observed signals from the microphone group G2 to the neural network to calculate the occupancy M$_2$(t).

The integration unit 105 generates an integrated mask obtained by integrating the masks (occupancies) estimated for the respective microphone groups (Step S106).

First Modification

The explanation described above illustrates the example in which features extracted with the extraction unit 102 are input, as input information, to the neural network. The following explanation illustrates an example in which K observed signals $x_k$ (k=1 to K) are input as input information. The neural network according to the present modification is learned to receive observed signals and estimate occupancy of the sound signal. In the present modification, it is unnecessary to include the extraction unit 102.

The estimation unit 104 of the present modification captures a signal sequence of the observed signal for each of time frames in the same manner as short-time Fourier transform, and inputs the captured signal sequence to the neural network.

The neural network receives input information obtained by laterally connecting K captured signal sequences in the time frame t, as illustrated in the following expression (31).

$$x(t)=[x_1(l_t),x_1(l_t+1), \ldots, x_1(l_t+\Delta_L), x_2(l_t),x_2(l_t+1), \ldots, x_2(l_t+\Delta_L), \ldots, x_K(l_t),x_K(l_t+1), \ldots, x_K(l_t+\Delta_L)]' \quad (31)$$

In the expression, t(t=1 to T) is an index of the time frame, $l_t$ is the start time of the time frame t, and $\Delta_L$ is the length of the time frame.

A neural network having a weight being a real number is used as the neural network. An example of operations of the layers when the hidden layers are three layers is illustrated in the following expressions (32) to (35).

First layer: $h_1(t)=\tanh(R_1 x(t))$ \quad (32)

Second layer: $h_2(t)=\tanh(R_2 h_1(t))$ \quad (33)

Third layer: $h_3(t)=\tanh(R_3 h_2(t))$ \quad (34)

Output layer: Out$(t)=\text{sigmoid}(R_o h_3(t))$ \quad (35)

Symbols $h_1$(t), $h_2$(t), $h_3$(t), and Out(t) indicate vectors Indicating the outputs of the first layer, the second layer, the third layer, and the output layer, respectively. Symbols $R_1$, $R_2$, $R_3$, and $R_o$ indicate matrixes (weight matrixes) Indicating the weights (real-valued) of the first layer, the second layer, the third layer, and the output layer, respectively.

Learning of weight of the neural network having weights being real numbers can be achieved by the method disclosed in Reference Document 2 described above.

The correction unit 103 of the present modification is capable of correcting the observed signals $x_k$ on the basis of $\tau_k$ even when K observed signals $x_k$ (k=1 to K) are input without any processing. First, the maximum value of $\tau_k$ (k=1 to K) is denoted by $\tau_{max}$. Thereafter, the correction unit 103 determines $\tau'_k$ with the following expression (36).

$$\tau'_k = \tau_k - \tau_{max} \quad (36)$$

Lastly, the correction unit 103 shifts the section selected in the time frame t by the number of samples corresponding to int($|\tau'_k/\Delta_t|$), captures and inputs the signal sequence of the shifted section. The symbol $\Delta_t$ indicates the sampling period, |•| indicates an operation to obtain the absolute value, and int indicates an operation to obtain an integer. Specifically, the corrected input to the neural network is an input as expressed with the following expression (37).

$$x'(t) = \left[ x_1\left(1_t - int\left(\left|\frac{\tau'_1}{\Delta_t}\right|\right)\right), x_1\left(1_t + 1 - int\left(\left|\frac{\tau'_1}{\Delta_t}\right|\right)\right), \ldots, \right.$$
$$x_1\left(1_t + \Delta_L - int\left(\left|\frac{\tau'_1}{\Delta_t}\right|\right)\right), x_2\left(1_t - int\left(\left|\frac{\tau'_2}{\Delta_t}\right|\right)\right), x_2\left(1_t + 1 - int\left(\left|\frac{\tau'_2}{\Delta_t}\right|\right)\right),$$
$$\ldots, x_2\left(1_t + \Delta_L - int\left(\left|\frac{\tau'_2}{\Delta_t}\right|\right)\right), x_K\left(1_t - int\left(\left|\frac{\tau'_K}{\Delta_t}\right|\right)\right),$$
$$\left. x_K\left(1_t + 1 - int\left(\left|\frac{\tau'_K}{\Delta_t}\right|\right)\right), \ldots, x_K\left(1_t + \Delta_L - int\left(\left|\frac{\tau'_K}{\Delta_t}\right|\right)\right)\right], \quad (37)$$

Second Modification

The explanation described above illustrates the example of using a neural network learned to output occupancy of the sound signal coming from a predetermined direction (for example, 0° direction). The structure may use a neural network learned to output occupancy of the sound signal coming from the direction included in a direction range (for example, direction of 0° to 30°), not one direction.

As another example, the structure may use a neural network learned to determine occupancy of the sound signal coming from a predetermined direction range (for example, direction of 0° to 30°), to determine occupancy of the sound signal coming from the direction included in a range (for example, 60° to 90°) different from the predetermined direction range. In this case, the occupancy can be determined by, for example, performing correction in the same manner as the correction described above, with $\theta_{init}$ set to 15° (the center of the direction of 0° to 30°) and $\theta_{tgt}$ set to 75° (the center of the direction of 60° to 90°).

Third Modification

The method similar to the embodiment described above is applicable even when the microphones and the sound source are not positioned on the same plane. For example, the initial target direction (perpendicular plane) in the perpendicular plane is set as $\phi_{init}$, one of the target directions (perpendicular plane) is set as $\phi_{tgt}$, and the structure is capable of estimating masks with the sound signals coming from the $\theta_{init}$ direction in the plane in advance and the $\theta_{tgt}$ direction in the perpendicular plane as the occupancies. In addition, correction is possible by a method similar to the method described above.

The following is discussion on an example in which acoustic waves come in the plane direction $\theta$ and the perpendicular plane direction $\phi$. The unit vector of the coming direction of plane waves is expressed with the following expression (38).

$$u_\theta = (\cos\phi \cos\theta, \cos\phi \sin\theta, \sin\phi)' \quad (38)$$

Accordingly, $\tau_1$ and $\tau_2$ in the case of Case 1 can be determined with the following expressions (39) and (40).

$$\tau_1 = (d_x/2c) \times (\cos\phi_{init} \sin\theta_{init} - \cos\phi_{tgt} \sin\theta_{tgt}) \quad (39)$$

$$\tau_2 = -(d_x/2c) \times (\cos\phi_{init} \sin\theta_{init} - \cos\phi_{tgt} \sin\theta_{tgt}) \quad (40)$$

In addition, $\tau_1$ and $\tau_2$ in the case where both Case 1 and Case 2 occur can be determined with the following expressions (41) and (42).

$$\tau_1 = (d_{old}/2c) \times \cos\phi_{init} \sin\theta_{init} - (d_{new}/2c) \times \cos\phi_{tgt} \sin\theta_{tgt} \quad (41)$$

$$\tau_2 = -(d_{old}/2c) \times \cos\phi_{init} \sin\theta_{init} + (d_{new}/2c) \times \cos\phi_{tgt} \sin\theta_{tgt} \quad (42)$$

The expression (21) indicating the output of the estimation unit 104 can be replaced by, for example, the following expression (43).

$$M(t) = \left[ \operatorname*{argmax}_{\theta_{tgt}, \phi_{tgt} \in D} m(t, 0, \theta_{tgt}, \phi_{tgt}), \operatorname*{argmax}_{\theta_{tgt}, \phi_{tgt} \in D} m(t, 1, \theta_{tgt}, \phi_{tgt}), \ldots, \operatorname*{argmax}_{\theta_{tgt}, \phi_{tgt} \in D} m(t, f, \theta_{tgt}, \phi_{tgt}) \right] \quad (43)$$

As described above, the signal processing apparatus according to the first embodiment estimates occupancy (mask) for each time frequency point of the sound signal in the space corresponding to the observed signal, for each of a plurality of observed signals acquired from a plurality of microphone groups, and generates an integrated mask obtained by integrating the estimated masks. This structure enables, for example, determination that the sound is the target sound when the sound source exists in a specific space, and that the sound is obstructing sound when the sound source exists in spaces other than the specific space. Specifically, this structure enables determination (extraction) of the sound signal with high accuracy. This structure also enables achievement of similar signal processing, without newly learning a neural network, even when the number of channels of the observed signals changes.

Second Embodiment

A signal generation system according to the second embodiment has a structure in which part of functions of the signal processing apparatus according to the first embodiment is executed with an external device (server apparatus). Specifically, the signal generation system according to the second embodiment achieves signal generation processing distributed among a plurality of apparatuses.

Figure 7:
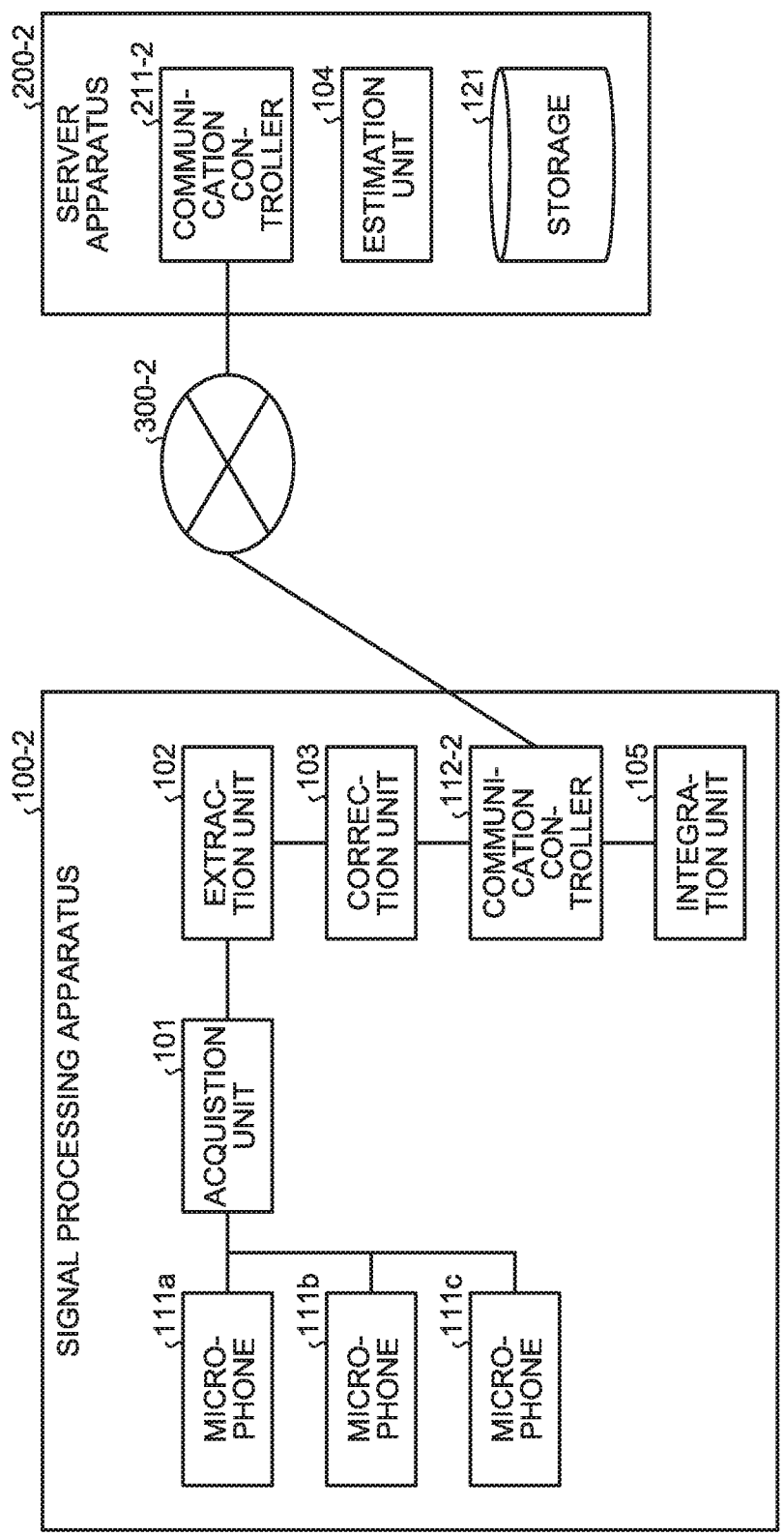
FIG. 7 is a block diagram illustrating a signal processing apparatus and a server apparatus according to a second embodiment.

FIG. 7 is a block diagram illustrating an example of configuration of a signal processing apparatus 100-2 and a server apparatus 200-2 according to the second embodiment. As illustrated in FIG. 7, the signal processing apparatus 100-2 and the server apparatus 200-2 are connected through a network. 300-2. The network 300-2 is, for example, the Internet, but may be a network of any form.

The signal processing apparatus 100-2 includes a plurality of microphones 111a, 111b, and 111c, the acquisition unit 101, the extraction unit 102, the correction unit 103, a communication controller 112-2, and the integration unit 105. The server apparatus 200-2 includes a communication controller 211-2, the estimation unit 104, and the storage 121.

In the second embodiment, the estimation unit 104 and the storage 121 are included in the server apparatus 200-2, and these units are removed from the signal processing apparatus 100-2. In addition, each of the apparatuses is provided with a communication controller (communication controllers 112-2 and 211-2). The same functions as those in the first embodiment are denoted by the same reference numerals, and an explanation thereof is omitted herein.

The communication controller 112-2 controls communication with an external device, such as the server apparatus 200-2. For example, the communication controller 112-2 transmits features (or corrected features corrected with the correction unit 103) extracted with the extraction unit 102 to the server apparatus 200-2. The communication controller 112-2 also receives information, such as a processing result obtained with the estimation unit 104, from the server apparatus 200-2.

The communication controller 211-2 controls communication with an external device, such as the signal processing apparatus 100-2. For example, the communication controller 211-2 receives features transmitted from the signal processing apparatus 100-2. The communication controller 211-2 also transmits information, such as a processing result obtained with the estimation unit 104, to the server apparatus 100-2.

The method for distributing the functions is not limited to the example of FIG. 7, but may be any distribution method. For example, the server apparatus 200-2 may further include functions of the extraction unit 102, the correction unit 103, and the integration unit 105. In this case, the server apparatus 200-2 corresponds to the signal processing apparatus.

The server apparatus 200-2 may be physically formed of one hardware, or one or more hardware. The server apparatus 200-2 may be constructed on a cloud environment.

The whole flow of signal generation processing in the second embodiment is similar to that illustrated in FIG. 6 illustrating the signal generation processing of the first embodiment, and an explanation thereof is omitted.

As described above, the second embodiment achieves functions similar to those in the first embodiment, with the system including a plurality of apparatuses.

As explained above, the first and the second embodiments enables determination (extraction) of the sound signal with higher accuracy.

Figure 8:
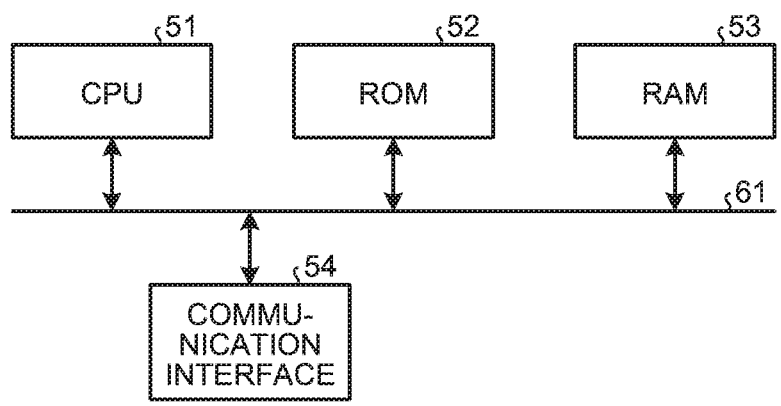
FIG. 8 is a hardware configuration diagram of the apparatus according to the first or the second embodiment.

The following is an explanation of hardware configuration of each of the apparatuses (signal processing apparatus and server apparatus) according to the first or the second embodiment, with reference to FIG. 8. FIG. 8 is an explanatory drawing illustrating a hardware configuration example of the apparatus according to the first or the second embodiment.

The apparatus according to the first or the second embodiment includes a controller, such as a CPU 51, storage devices, such as a read only memory (ROM) 52 and a RAM 53, communication interface 54 connected to the network to perform communication, and a bus 61 connecting the units.

The computer program executed in the apparatus according to the first or the second embodiment is provided in a form installed in advance in the ROM 52 or the like.

The computer program executed in the apparatus according to the first or the second embodiment may be configured to be recorded on a computer-readable recording medium, such as a compact disc read only memory (CD-ROM), a flexible disk (FD), a compact disc recordable (CD-R), and a digital versatile disc (DVD), as a file in an installable form or an executable form, and provided as a computer program product.

As another example, the computer program executed in the apparatus according to the first or the second embodiment may be configured to be stored on a computer connected to a network, such as the Internet, and provided by being downloaded through the network. The computer program executed in the apparatus according to the first or the second embodiment may also be configured to be provided or distributed through a network, such as the Internet.

The computer program executed in the apparatus according to the first or the second embodiment is capable of causing a computer to function as each of the units of the apparatus described above. The computer is capable of reading, with the CPU 51, a computer program from a computer-readable storage medium onto a main storage device and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing apparatus comprising:
one or more processors configured to:
acquire a plurality of observed signals from a plurality of microphone groups, each of the microphone groups comprising a microphone set comprising at least one microphone selected from a plurality of microphones, each microphone set of the microphone groups being different from each other, at least one of the plurality of microphone groups comprising two or more microphones of the plurality of microphones;
for each of the plurality of observed signals, estimate a mask indicating occupancy for each time frequency point of a sound signal of a space corresponding to an observed signal in a plurality of spaces; and
integrate the masks estimated for the plurality of observed signals to generate an integrated mask indicating occupancy for each of the time frequency points of a target sound signal in a target space determined based at least in part on the plurality of spaces.

2. The signal processing apparatus according to claim 1, wherein each of the plurality of spaces corresponds to one of the plurality of microphone groups, and is determined with at least one of a direction in a plane determined with the plurality of microphones included in a corresponding microphone group and a direction perpendicular to the plane.

3. The signal processing apparatus according to claim 1, wherein the one or more processors estimate the mask based at least in part on the observed signal using a neural network receiving input information and outputting occupancy for each of the time frequency points of the sound signal of a second space, the input information being one of the observed signal or a feature of the observed signal.

4. The signal processing apparatus according to claim 3, wherein the neural network is a complex-valued neural network.

5. The signal processing apparatus according to claim 3, wherein the one or more processors further configured to:
acquire parameters indicating at least part of the spaces and positions of the plurality of microphones included in the plurality of microphone groups, and
correct the input information based at least in part on the acquired parameters.

6. The signal processing apparatus according to claim 3, wherein the one or more processors further configured to:
acquire parameters indicating at least part of the spaces and positions of the plurality of microphones included in the plurality of microphone groups, and
correct parameters of the neural network based at least in part on the acquired parameters.

7. The signal processing apparatus according to claim 1, wherein the one or more processors generate the integrated mask with a mean value of the masks, product of the masks, or median of the masks.

8. A signal processing method comprising:
acquiring a plurality of observed signals from a plurality of microphone groups, each of the microphone groups comprising a microphone set comprising at least one microphone selected from a plurality of microphones, each microphone set of the plurality of microphone groups being different from each other, at least one of the plurality of microphone groups comprising two or more microphones of the plurality of microphones;
for each of the plurality of observed signals, estimating a mask indicating occupancy for each time frequency point of a sound signal of a space corresponding to an observed signal in a plurality of spaces; and
integrating masks estimated for the plurality of observed signals to generate an integrated mask indicating occupancy for each of the time frequency points of a target sound signal in a target space determined based at least in part on the plurality of spaces.

9. A computer program product having a non-transitory computer readable medium comprising programmed instructions, wherein the instructions, when executed by a computer, cause the computer to:
acquire a plurality of observed signals from a plurality of microphone groups, each of the microphone groups comprising a microphone set comprising at least one microphone selected from a plurality of microphones, each microphone set of the microphone set of the plurality of microphone groups being different from each other, at least one of the plurality of microphone groups comprising two or more microphones of the plurality of microphones;
for each of the plurality of observed signals, estimate a mask indicating occupancy for each time frequency point of a sound signal of a space corresponding to an observed signal in a plurality of spaces; and
integrate the masks estimated for the plurality of observed signals to generate an integrated mask indicating occupancy for each of the time frequency points of a target sound signal in a target space determined based at least in part on the plurality of spaces.

* * * * *